Patented Aug. 4, 1936

2,050,075

UNITED STATES PATENT OFFICE 2,050,075

MERCURY COMPOUNDS OF BENZOTRIFLUORIDE

Ernest H. Volwiler, Highland Park, and Elmer B. Vliet, Pine Bluff, Ill., assignors to Abbott Laboratories, North Chicago, Ill., a corporation of Illinois No Drawing. Application October 18, 1933
Serial No. 694,112

5 Claims. (Cl. 260—13)

Our invention relates to the preparation of mercury compounds of benzotrifluoride and substituted benzotrifluoride, having the general formula:

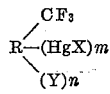

wherein R is a benzene nucleus or a substituted benzene nucleus, X is an acid substituent, such as a halogen or an acetoxy, hydroxy, or anhydrohydroxy group, Y is a nitro, hydroxy or carboxy group, $m$ is 1 or 2, and $n$ is 1 or 2. If $n$ is 2, the Y's may be the same or different groups.

These new compounds are valuable as antiseptics and for other therapeutic purposes in which mercury compounds are employed. The three fluorine atoms attached to the carbon enhance the antiseptic action of the compounds. Furthermore, when three fluorine atoms are attached to the same carbon, as in this invention, the fluorine is not readily hydrolyzed, and the compounds are very stable and non-irritating.

Example 1

Chloromercuri-benzotrifluoride

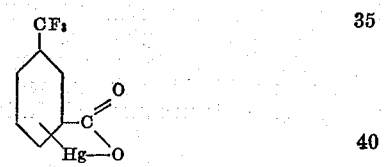

8.2 grams of 3-amino-benzotrifluoride is dissolved by warming in a solution of 20 cc. concentrated hydrochloric acid (sp. gr. 1.19) in 32 cc. water. The solution is cooled to 5° C., whereupon the hydrochloride salt of the aminobenzotrifluoride partially crystallizes. A solution of 3.6 grams of sodium nitrite in 10 cc. of water is slowly added, with stirring, and cooling, so that the temperature of the reaction mixture does not go above 5° C. during the addition. The resulting solution is quickly filtered through glass wool from any traces of insoluble material.

A solution of 13.5 grams of mercuric chloride in 14 cc. of concentrated hydrochloric acid (sp. gr. 1.19) and 14 grams of ice is quickly added to the cold filtrate, whereupon a white precipitate of the mercuric chloride addition product of the diazonium chloride derivative of benzotrifluoride separates. After cooling and standing for an hour, this product is filtered off onto a Buchner funnel, washed with water, alcohol, and ether, and allowed to dry.

In order to obtain the mercury compound desired, 9 grams of the mercuric chloride addition product of the diazonium chloride derivative of benzotrifluoride is intimately mixed with 2.3 grams of copper powder. The mixture is placed in a flask attached to a reflux condenser and 40 cc. of acetone is added. Upon standing, a reaction soon takes place accompanied by a vigorous evolution of nitrogen. This reaction soon subsides and the mixture is permitted to stand overnight. The acetone solution is then filtered from insoluble material, and the resulting solution is evaporated to dryness on a water bath. The resulting product is purified by dissolving the residue in hot dilute methyl alcohol, boneblacking the hot solution, filtering and allowing the product to crystallize upon cooling. It is further purified by several crystallizations from carbon tetrachloride. The chloromercuri-benzotrifluoride thus obtained is a white, crystalline product, relatively insoluble in water, soluble in methyl and ethyl alcohol and in acetone. It melts sharply in the neighborhood of 149–150° C.

The reaction is essentially as follows:

$$C_6H_4(CF_3)NH_2HCl + HNO_2 \rightarrow$$
$$C_6H_4(CF_3)N=NCl + 2H_2O$$
$$C_6H_4(CF_3)N=NCl.HgCl_2 \rightarrow$$
$$C_6H_4(CF_3)N=NCl.HgCl_2$$
$$C_6H_4(CF_3)N=NCl.HgCl_2 + 2Cu \rightarrow$$
$$C_6H_4(CF_3)HgCl + N_2 + 2CuCl$$

Example 2

Anhydro (hydroxymercuri-3-carboxy) benzotrifluoride

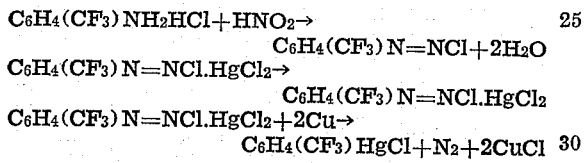

The mercury salt of 3-carboxy-benzotrifluoride is prepared first by dissolving one gram of the acid, 3-carboxy-benzotrifluoride, in 5 cc. of water containing one molecular equivalent of sodium hydroxide and then adding a solution of mercuric acetate until no more white precipitate forms. This precipitate is filtered off, washed with water and dried until free from water.

This mercury salt of 3-carboxy-benzotrifluoride is then heated in an oil bath at 170° C. for several hours until a test portion dissolves in sodium hydroxide solution without the formation of mercuric oxide, indicating that the rearrangement is complete.

The resulting product is purified by dissolving in sodium hydroxide solution, boneblacking the heated solution, and filtering, thus giving a solution of the sodium salt of hydroxy-mercuri-3-carboxy benzotrifluoride while hot, the solution is treated with dilute acetic acid. The precipitated product is filtered off while hot, washed with hot water and dried.

The anhydro (hydroxymercuri-3-carboxy) benzotrifluoride so obtained is a white solid, relatively insoluble in water, but readily soluble in solutions of sodium or potassium hydroxide. It decomposes without melting when heated.

The reaction is essentially as follows:

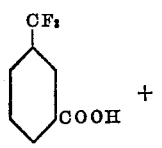 + $HNO_3$ → 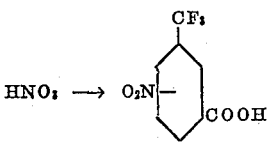 $\xrightarrow{Hg(OCOCH_3)_2}$ 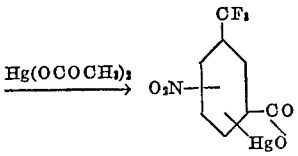

$C_6H_4(CF_3)COOH + Hg(OCOCH_3)_2 \rightarrow$
$[C_6H_4(CF_3)COO]_2Hg + 2CH_3.COOH$
$[C_6H_4(CF_3)COO]_2Hg \rightarrow$
$C_6H_3(CF_3)COOHg + C_6H_4(CF_3)COOH$

Example 3

Anhydro (hydroxymercuri-3-carboxy)-mononitrobenzotrifluoride.

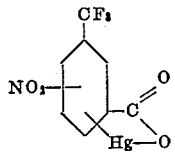

Mononitro-3-carboxy-benzotrifluoride is prepared by nitrating 3.5 grams of 3-carboxy-benzotrifluoride with a mixture of 15 cc. of fuming sulphuric acid (15% $SO_3$) and 1.1 grams of fuming nitric acid (sp. gr. 1.52) by heating on a water bath at 100° C. for one-half hour. Upon cooling the reaction mixture and adding it to iced water, the product separates. It is purified by crystallizing from hot water and melts at about 125° C.

The mercury salt of this acid, mononitro-3-carboxy-benzotrifluoride, is prepared in a manner similar to that used in Example 2. The resulting mercury salt of mononitro-3-carboxy-benzotrifluoride is then heated in an oil bath at 235° C. for several hours until a test portion dissolves in sodium hydroxide solution without the formation of mercuric oxide, indicating that the rearrangement is complete. The resulting product is purified by dissolving in sodium hydroxide solution, boneblacking the heated solution, and filtering. This produces a solution containing the sodium salt of nitro-hydroxymercuri-3-carboxy-benzotrifluoride. While hot, the solution is treated with dilute acetic acid. The precipitated product is filtered off while hot, washed with hot water and dried.

The anhydro (hydroxymercuri-3-carboxy)-mononitro-benzotrifluoride, thus formed, is an almost white solid, relatively insoluble in water but soluble in solutions of sodium or potassium hydroxide. It decomposes without melting when heated.

The reaction is essentially as follows:

Example 4

Dichlorodimercuri-3-hydroxy-benzotrifluoride

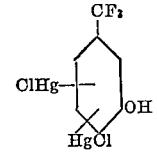

Five grams of 3-hydroxy-benzotrifluoride is dissolved in 500 cc. of distilled water by warming to about 90° C. A solution of mercuric acetate, prepared by dissolving 20 grams of mercuric acetate in a solution of one cc. glacial acetic acid in 100 cc. of distilled water and filtering, is slowly added to the solution of the 3-hydroxy-benzotrifluoride. During this addition, the reaction mixture is stirred and maintained at a temperature of about 90° C. About one-half hour is required for the addition during which a solid reaction product begins to form and separate. The reaction mixture is cooled and the product is filtered off and washed with distilled water.

This compound is acetoxy-mercury-anhydro (hydroxy-mercuri-3-hydroxy) benzotrifluoride.

The product is purified by dissolving it in dilute sodium hydroxide, boiling with charcoal, filtering, cooling the filtrate to room temperature and precipitating the product by the addition of an excess of dilute hydrochloric acid. The product is filtered off, washed with distilled water and dried.

The dichlorodimercuri-3-hydroxy-benzotrifluoride so obtained is an almost white solid, relatively insoluble in water but readily soluble in solutions of sodium or potassium hydroxide. It decomposes without melting when heated.

The reaction is essentially as follows:

(1)     + 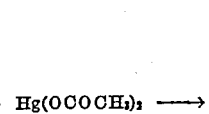 → 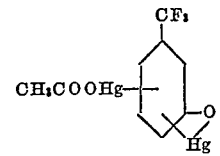

(2)    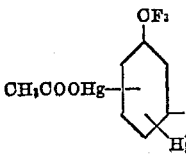 + NaOH → 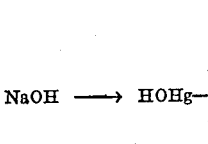 $\xrightarrow{HCl}$ 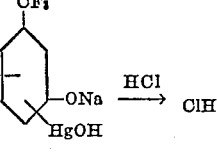

It will be understood that the above examples are merely illustrative of our invention, the scope of which is to be determined by the appended claims, which are to be interpreted as broadly as the state of the art will permit.

We claim as our invention:

1. The compound anhydro-(hydroxy-mercuri-3-carboxy)-benzotrifluoride.

2. The compound anhydro-(hydroxy-mercuri-3-carboxy)-mononitro benzotrifluoride.

3. The compound dichloro-dimercuri-3-hydroxy-benzotrifluoride.

4. A mercury benzotrifluoride compound wherein mercury is directly attached to the benzene ring, said compound having antiseptic properties.

5. A halo mercuri-benzotrifluoride, said compound having antiseptic properties.

ERNEST H. VOLWILER.
ELMER B. VLIET.